April 2, 1968 KAZUO HASHIMOTO 3,376,390

TELEPHONE ANSWERING DEVICE

Filed July 8, 1963 5 Sheets-Sheet 1

INVENTOR.
KAZUO HASHIMOTO
BY
MAHONEY, HALBERT & HORNBAKER
ATTORNEYS

April 2, 1968 KAZUO HASHIMOTO 3,376,390

TELEPHONE ANSWERING DEVICE

Filed July 8, 1963 5 Sheets-Sheet 2

INVENTOR.
KAZUO HASHIMOTO
BY
MAHONEY, HALBERT &
HORNBAKER
ATTORNEYS

April 2, 1968 KAZUO HASHIMOTO 3,376,390

TELEPHONE ANSWERING DEVICE

Filed July 8, 1963 5 Sheets-Sheet 3

INVENTOR.
KAZUO HASHIMOTO
BY
MAHONEY, HALBERT & HORNBAKER
ATTORNEYS

TELEPHONE ANSWERING DEVICE

Filed July 8, 1963 5 Sheets-Sheet 4

INVENTOR.
KAZUO HASHIMOTO
BY
MAHONEY, HALBERT &
HORNBAKER
ATTORNEYS

INVENTOR.
KAZUO HASHIMOTO
BY
MAHONEY, HALBERT &
HORNBAKER
ATTORNEYS

United States Patent Office 3,376,390
Patented Apr. 2, 1968

3,376,390

TELEPHONE ANSWERING DEVICE

Kazuo Hashimoto, Tokyo, Japan
(28–2,2-chome Komazawa, Setagawa-ku, Tokyo, Japan)

Continuation-in-part of application Ser. No. 853,901, Nov. 18, 1959. This application July 8, 1963, Ser. No. 293,364
Claims priority, application Japan, Dec. 30, 1958, 33/38,442
6 Claims. (Cl. 179—6)

ABSTRACT OF THE DISCLOSURE

An apparatus having an actuating timer circuit which operates one time or many times while recording the incoming message, having a beep tone transmitting circuit which uses howling, and having a conductive foil on the outgoing message tape for completing a breaking circuit with an associated pole piece.

This application is a continuation-in-part of application Ser. No. 853,901, filed November 18, 1959, and entitled "Self-Talking and Self-Recording Telephone Device," now abandoned.

This invention relates to an automatic telephone answering device and, more particularly, to an automatic telephone answering device which is characterized by the fact that it is capable of transmitting a recorded message to a calling person over the telephone, and in addition, capable of receiving and recording the calling party's message.

One of the major problems encountered in the use of conventional telephone answering devices is the relatively large size of the devices and, in most cases, the necessity for directly connecting the devices to the line of the associated telephone.

It is, therefore, an object of my invention to provide a telephone answering device which is characterized by the fact that it need merely be disposed below the associated telephone with the associated telephone resting thereupon and there need be no electrical connection whatsoever into the line of the associated telephone. Therefore, the automatic telephone answering device of my invention can be utilized, as desired, with a number of different telephones in different locations, since it is not necessary, in any way, to operatively connect the automatic answering device of my invention into the line of the associated telephone.

One of the major problems encountered in conventional automatic telephone answering devices is the control of the time which is allotted to the outgoing and incoming messages. In prior art devices, relatively complex circuitry has been utilized to determine both the length of the outgoing and the length of the incoming messages. Because of such complex circuitry, such prior art devices have been costly to manufacture and expensive to maintain in operative condition.

It is, therefore, another object of my invention to provide a device of the aforementioned character which is characterized by the incorporation of electromechanical means adapted to determine the time span of the outgoing message and electronic circuitry adapted to determine the time allotted to the incoming message.

Another object of my invention is the provision of an automatic telephone answering device of the aforementioned character which incorporates two recording tapes, an outgoing message tape and an incoming message tape, said outgoing message tape being adapted to receive and, in conjunction with associated recording and transmitting heads, transmit a pre-recorded outgoing message, and said incoming message tape being adapted, in conjunction with associated playback and recording heads, to record an incoming message, said device being characterized by the fact that, upon automatic initiation of the operation of the device, the outgoing message tape will operate for a predetermined period and then automatically cease to operate and by the fact that, upon cessation of the operation of the outgoing message tape, the incoming message tape will automatically initiate its operation and receive a message in either a predetermined time span or continuously for as long a time as the calling party wishes to talk.

An additional object of my invention is the provision of an automatic telephone answering device of the aforementioned character wherein the time allotted to the outgoing message is determined by time control means including a conductor on the outgoing message tape itself and associated circuit breaking means adapted to be engaged by said conductor to terminate the operation of the circuitry associated with the outgoing message tape.

Therefore, the time allotted to the outgoing message is variable and can be determined by a number of variable factors including the length of the outgoing message tape, the location of the conductor on the outgoing message tape and the speed at which the outgoing message tape is translated across the associated recording and playback head.

Another object of my invention is the provision of an automatic telephone answering device of the aforementioned character wherein the conductor utilized in conjunction with the outgoing message tape is constituted by a length of flexible metallic foil secured to the outgoing message tape at a desired location and wherein the circuit breaking means is characterized by the inclusion of poles adapted to short the circuit controlling the operation of the outgoing message tape when the conductive foil comes in contact therewith.

As previously mentioned, another problem encountered in the manufacture and utilization of conventional telephone answering devices is the determination and control of the time span allotted to the incoming message. Usually, the time span allotted to the incoming message is determined by circuit controlling means which is relatively inflexible in the sense that a predetermined time is allotted to the incoming message and there is no possibility of variation of the time allotted to the incoming message.

Another object of my invention is the provision of an automatic telephone answering device of the aforementioned character which incorporates time control means for the incoming message characterized by the fact that it may be set either to permit an incoming message from a calling party of predetermined length to be received or to permit, in the alternative, an incoming message of indeterminate length to be received.

Another object of the invention is the provision of a telephone answering and recording device of the aforementioned character which is adapted to transmit an audible signal to a calling party to indicate to the calling party that he may initiate the message to be recorded on the device, the audible signal being porduced through the audio-amplifier of the device without the necessity for the utilization of an auxiliary signal generating circuit.

In conventional telephone answering and recording devices, the length of the incoming message being recorded is determined by circuitry incorporating timing means such as a thermistor, or the like. Therefore, the incoming message delivered by the calling party is limited to a predetermined length of time. Moreover, the nature of the circuitry utilized in conventional devices is such that precise control of the time period is not possible because of such variables as temperature, voltage drop and the like.

A further object of my invention is the provision, in a telephone answering and recording device of the aforementioned character, of a timing circuit for the incoming message which is capable of permitting the recording of a message of predetermined length or the recording of a message of indeterminate length. The user of the device may select the type of recordation of incoming messages desired by merely moving a switch on the device from the fixed recordation to the unlimited recordation periods.

An additional object of my invention is the provision of a timing control circuit in the aforementioned device which is characterized by the fact that, when the circuit is functioning in a continuous manner to record incoming messages for unlimited periods of time, the control of the device is determined by the continuing voice of the calling party.

The device of the invention is characterized by the provision of a driving capstan for the outgoing message tape and incoming message tape and the provision of incoming and outgoing message pinch or drive rollers mounted on a common yoke and adapted to be alternately moved into positions in which they urge the associated tape into contiguity with the periphery of the driving capstan.

An additional object of my invention is the provision of a latch adapted to maintain the aforementioned yoke and, thus, the associated pinch or drive rollers in neutral positions to eliminate the possibility that, when the device is inoperative, flat spots may be created on the pinch or drive rollers which will prevent the proper functioning thereof.

Other objects and advantages of the invention will be apparent from the following specification and the accompanying drawings, which are for the purpose of illustration only, and in which.

Figure 1:
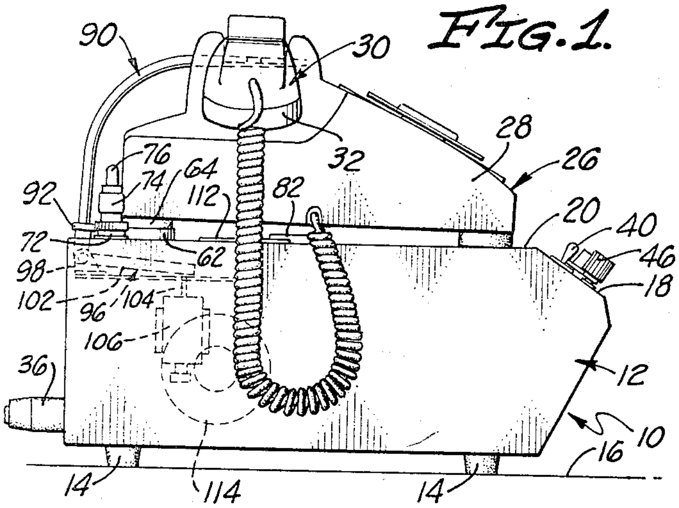
FIG. 1 is a side elevational view of a telephone answering device constructed in accordance with the teachings of the invention.
Figure 2:
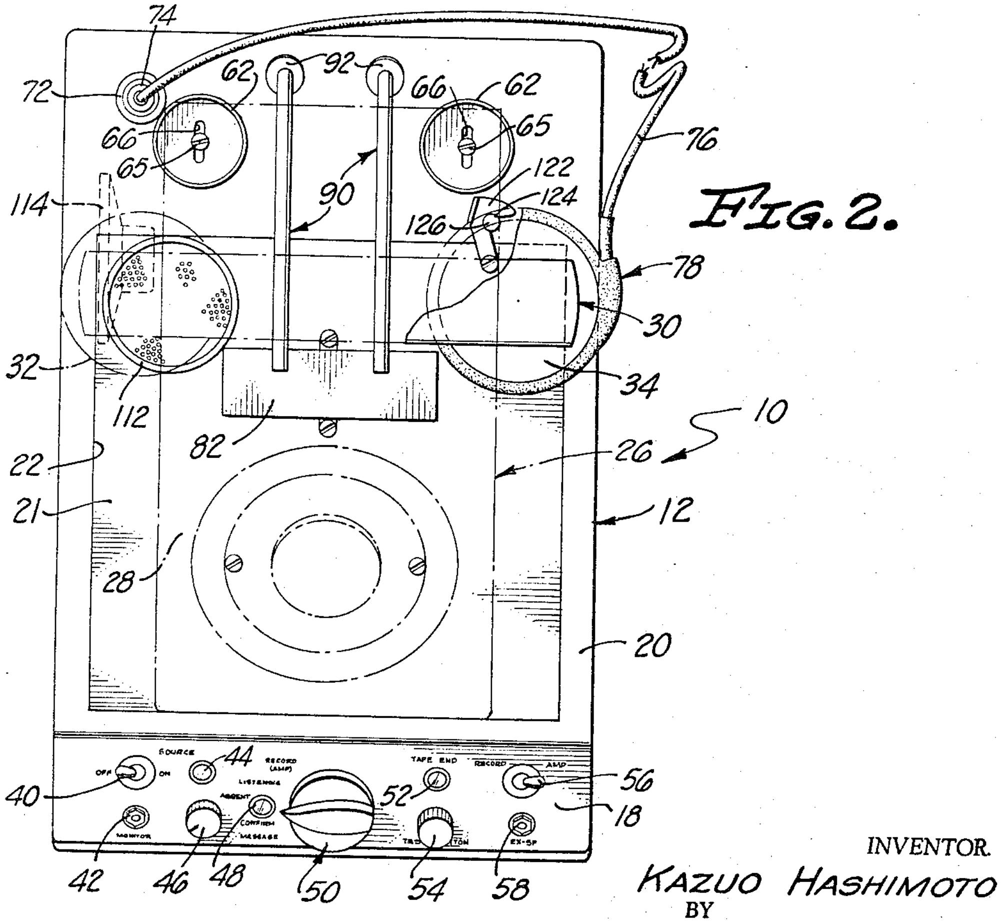
FIG. 2 is a top plan view.
Figure 3:
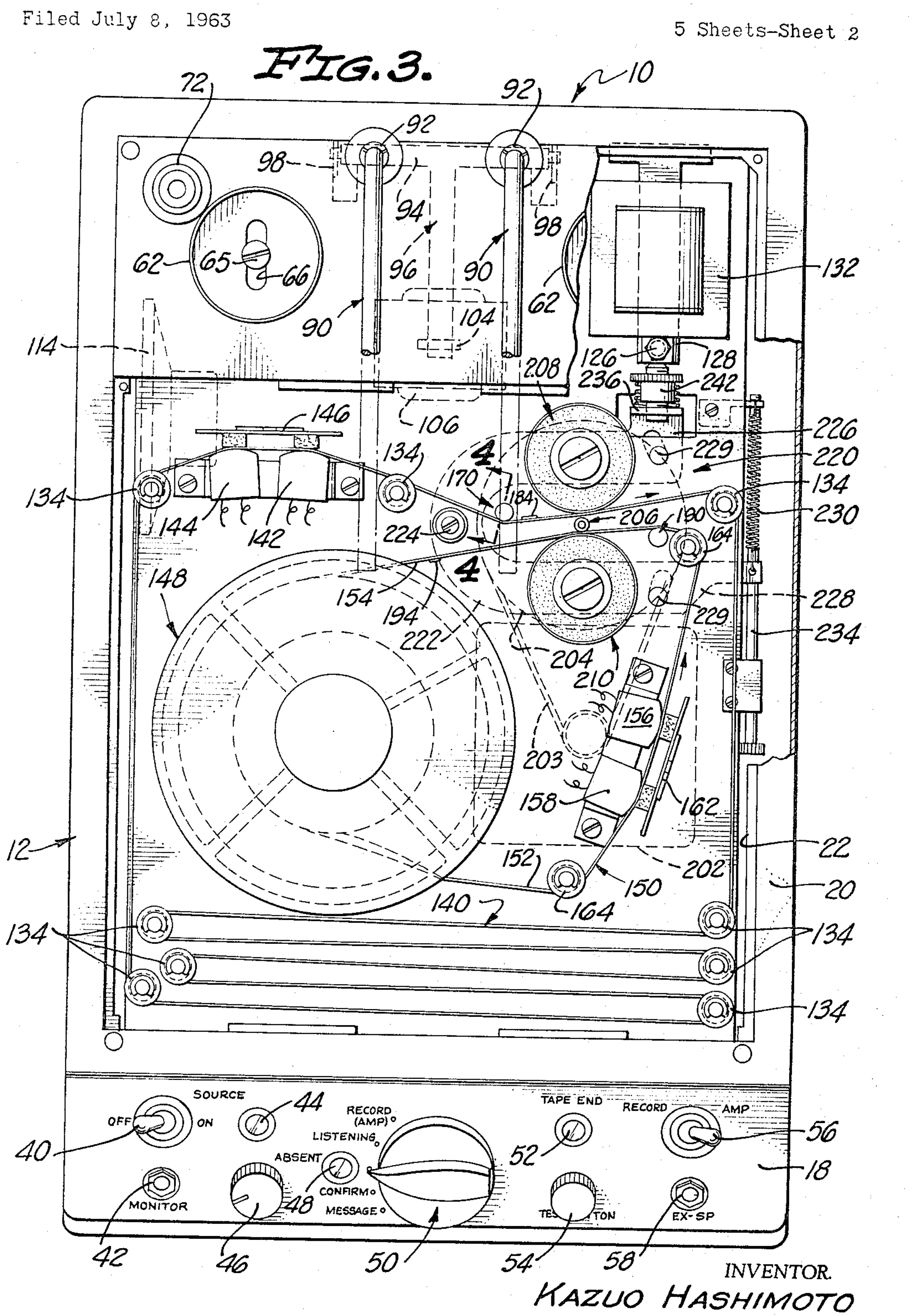
FIG. 3 is a top plan view of the telephone answering device with the cover of the housing therefor removed.

Referring to the drawings, and particularly to FIGS. 1–3 thereof, I show a telephone answering device 10 constructed in accordance with the teachings of my invention, said device being incorporated in a substantially rectangular housing 12 which is supported on feet 14 engageable with an associated supporting surface 16, such as the top of a desk, or the like. The housing 12 includes a control panel 18 and a top wall 20 which is provided with a cover 21 over an opening 22, as best shown in FIG. 3 of the drawings, to facilitate access to the interior of said housing.

A conventional telephone 26 is adapted to be mounted, as best shown in FIGS. 1 and 2 of the drawings, in overlying relationship with the top wall 20 of the housing 12 and includes a base 28 and a handset 30 having a mouthpiece 32 and an earpiece 34. The electrical power input to the telephone answering device 10 is indicated at 36 in FIG. 1 of the drawings.

Located on the control panel 18 is an on-off switch 40 which is adapted to energize or de-energize the telephone answering device 10, a monitor receptacle 42, which is adapted to receive the plug of an earpiece, not shown, to permit a telephone conversation being recorded by the telephone answering device 10 to be monitored, and an indicator light 44 which is lit when the telephone answering device is operative. A volume control switch 46 is mounted on the control panel 18 immediately adjacent a selector switch 50 which is adapted to be rotated into any one of a plurality of positions, as will be described hereinbelow, to select the function which the telephone answering device 10 is to perform.

A light 48 indicates when the device 10 is functioning in the absent condition. An indicator light 52 serves, in a manner to be described in greater detail below, to indicate that either the outgoing message or incoming message tapes have reached their ends, and a test button 54 permits the functioning of the telephone answering device 10 to be tested by an operator prior to the actual utilization thereof. A recording switch 56 permits the utilization of the telephone answering device 10 as a tape recorder and a receptacle 58 is provided for the reception of an external speaker which can be utilized for public address purposes in a manner to be described in greater detail below.

Mounted on the top 20 of the housing 12 of the telephone answering device 10 is a pair of shallow receptacles 62, which, as best shown in FIGS. 1–2 of the drawings, are adapted to receive the rear feet 64 of the base 28 of the telephone 26 to locate said base in a pre-determined relationship with the top 20 of the device 10. The receptacles 62 may be adjusted by the loosening of adjustment screws 65 associated with slots 66 therein to accommodate telephones of different sizes.

A socket 72 is provided at the upper left-hand corner of the top 20 of the housing 12 for the reception of a plug 74 which is connected by a conductor 76 to induction coil means 78 adapted to encompass the earpiece 32 of the handset 30, as best shown in FIG. 2 of the drawings, for a purpose which will be described in greater detail hereinbelow. Mounted upon the cover 21 of the opening 22 in the top 20 of the housing 12 is an induction coil enclosure 82 which, as best shown in FIGS. 1 and 2 of the drawings, is adapted to underlie the base 28 of the telephone 26 immediately adjacent the annunciator, not shown, of the telephone to permit the housing 82 to be exposed to the magnetic flux generated when the annunciator is actuated by an incoming call. The annunciator can be a bell, buzzer, or other sound generating device.

Protruding upwardly from the rear portion of the top 20 of the housing 12 is a pair of substantially arcuate lifting arms 90 which, as best shown in FIGS. 1–3 of the drawings, have their lower extremities mounted in sockets 92. The sockets 92 are, as best shown in FIGS. 1 and 3 of the drawings, secured adjacent the opposite extremities of the head 94 of a T-shaped pivot bar 96, said opposite extremities being mounted for rotation in spaced brackets 98.

The central leg 102 of the pivot bar 96 is engaged upon the upper extremity of the armature 104 of a solenoid 106 which, when energized, causes the armature 104 to move upwardly to cause corresponding upward movement of the central leg 102 of the pivot bar 96. Upward movement of the central leg 102 of the pivot bar 96 causes corresponding rotation of the sockets 92 and consequent upward movement of the upper extremities of the lifting arms 90, which, as best shown in FIGS. 1 and 2 of the drawings, are located in underlying relationship with the handset 30 of the telephone 26.

The mode of energization of the solenoid 106 will be described in greater detail below, but, in any event, when the annunciator bell of the telephone 26 exposes the annunciator coil housing 82 to the magnetic flux caused by the energization of said bell, the solenoid 106 will be energized to raise the lifting arms 90 in the above described manner to permit the telephone answering device to deliver an outgoing message and record an incoming message.

Mounted in the cover 21 in the top 20 of the housing 12 is a perforated plate 112 which, as best shown in FIGS. 2 and 3 of the drawings, overlies a speaker 114 adapted to transmit the pre-recorded outgoing message to the mouthpiece 32 of the handset 30 after the handset 30 has been raised from operative relationship with the base 28 of the telephone 26 by the movement of the lifting arms 90.

Mounted in operative relationship with the cover 21 of the housing 12 is a hook 122 which, as best shown in FIGS. 2 and 3 of the drawings, is adapted to engage the head 124 of a pin 126 operatively secured to the armature 128 of a solenoid 132. The hook 122 maintains the pin 126 in a position which locates the armature 128 in a neutral condition, as will be explained hereinbelow, and, prior to energizing the telephone answering device 10, the hook 122 must be released from operative engagement with the head 124 of the pin 126 to permit free movement of the armature 128.

Mounted within the housing 12 of the telephone answering device 10, below the cover 21, is a plurality of guide rollers 134, as best shown in FIG. 3 of the drawings, said guide rollers being adapted to have entrained thereupon an outgoing message tape 140 which is constituted by an endless loop with certain of the guide rollers 134 being operatively associated with each other adjacent the control panel 18 of the housing 12 in such a manner as to provide a sinuous path enabling a relatively large amount of tape to be accommodated without the necessity for providing a reel therefor. The outgoing message tape 140 is adapted to have an outgoing message recorded thereupon by the energization of a recording and reproducing head 142 mounted in proximity to and in engagement with the outgoing message tape 140. Associated with the recording and reproducing head 142 is an erasing head 144, the outgoing message tape 140 being urged into operative engagemnt with said heads by a back-up pad 146.

Mounted within the housing 12 is a reel 148 for an incoming message tape 150 which is constituted by an endless loop entrained upon the reel 148 and having the unrecorded portion 152 thereof fed from the center of the reel 148 while the recorded portion 154 thereof is returned to the reel 148 adjacent its perimeter. The incoming message tape 150 has a recording and reproducing head 156 associated therewith, as best shown in FIG. 3 of the drawings, and adapted to record upon said tape an incoming message which is transmitted by the earpiece 34 of the handset to the coil means 78. An erasing head 158 is associated with the reproducing and recording head 156 and the incoming message tape 150 is biased into operative engagement with said head by a back-up pad 162. Guide rollers 164 have the incoming message tape 150 entrained thereupon for guiding said incoming message tape across the recording and erasing heads 156 and 158, respectively.

Figure 4:
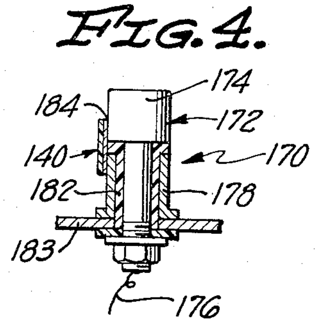
FIG. 4 is a vertical, sectional view taken on the broken line 4—4 of FIG. 3.

Associated with the outgoing message tape 140 is circuit breaking means 170 constituted by a composite pole 172 which includes a first pole piece 174 connected in the control portion of the circuit of the device 10 by means of a conductor 176 and a second pole piece 178 encompassing said first pole piece and electrically isolated therefrom by an insulating sleeve 182. The second pole piece 178 is connected to ground through the chassis 183 of the telephone answering device 10. Mounted upon the outgoing message tape 140, as best shown in FIGS. 3 and 4 of the drawings, is a length 184 of conductive foil which is adapted to bridge the first and second pole pieces 174 and 178, as best shown in FIG. 4 of the drawings, to break the circuit associated with the outgoing message tape 140 in a manner to be described in greater detail hereinbelow.

A similar circuit breaking means 190 is, as best shown in FIG. 3 of the drawings, associated with the incoming message tape 150, and incoming message tape 150 is provided with a corresponding length 194 of conductive foil adjacent its inner extremity so that the circuit breaking means 190 will automatically terminate the movement of the incoming message tape 150 when it has been fully recorded and is, thus, exhausted.

Mounted in operative relationship with the outgoing message tape 140 and incoming message tape 150 is drive means indicated generally at 200, said drive means including an electric motor 202, which, as best shown in FIG. 3 of the drawings, is operatively connected by a belt 203 to a pulley 304 which drives a capstan 206. The capstan 206 is mounted intermediate back-up or pinch rollers 208 and 210 associated, respectively, with the outgoing message tape 140 and the incoming message tape 150.

Operatively connected to the drive means 200 is actuating means 220 therefor, said actuating means including a substantially U-shaped yoke 222, FIG. 3, which is mounted for pivotal movement upon a pivot pin 224 and which has the pinch roller 208 mounted for rotation upon one leg 226 thereof and the pinch roller 210 mounted upon the other leg 228 thereof. Stop pins 229 limit the movement of the yoke 222 and a tension spring 230 connected to the leg 225 biases said leg toward the rear of the housing 12, FIG. 3, to normally urge the back-up roller 210 associated with the incoming message tape 150 against said tape to urge it into corresponding engagement with the perimeter of the capstan 206. An adjustment screw 234 limits the displacement of the yoke 222.

Operatively associated with a pad 236 on the arm 226 is an adjustable connector 242 which has one extremity engaged upon the armature 128 and its other extremity located in the pad 236. Therefore, when the armature 128 is projected from the solenoid 132 by the energization of the circuit associated therewith, in a manner to be described in greater detail below, the arm 226 of the yoke 222 is biased downwardly against the force of the spring 230 to urge the pinch roller 208 against the adjacent outgoing message tape 140 and to correspondingly urge said tape against the perimeter of the capstan 206 to cause said outgoing message tape to be driven thereby. Obviously, when the solenoid 132 is de-energized, the tension spring 230 will cause movement of the arm 228 of the yoke 222 in a counterclockwise direction to urge the pinch roller 210 associated with the incoming message tape 150 thereagainst to bring said incoming message tape 150 into contact with the capstan 206 to cause said incoming message tape to be driven by said capstan.

Obviously, it is undesirable for either the pinch roller 208 or 210 to be permanently biased against the capstan 206 because they are fabricated from deformable material such as rubber, or the like. Therefore, the pin 126 on the armature 128 is provided which urges the armature 128 into the solenoid 132 to permit the tension spring 230 to locate the yoke 222 in a neutral position in which neither of the pinch rollers is engaged upon the capstan 206.

Figure 5:
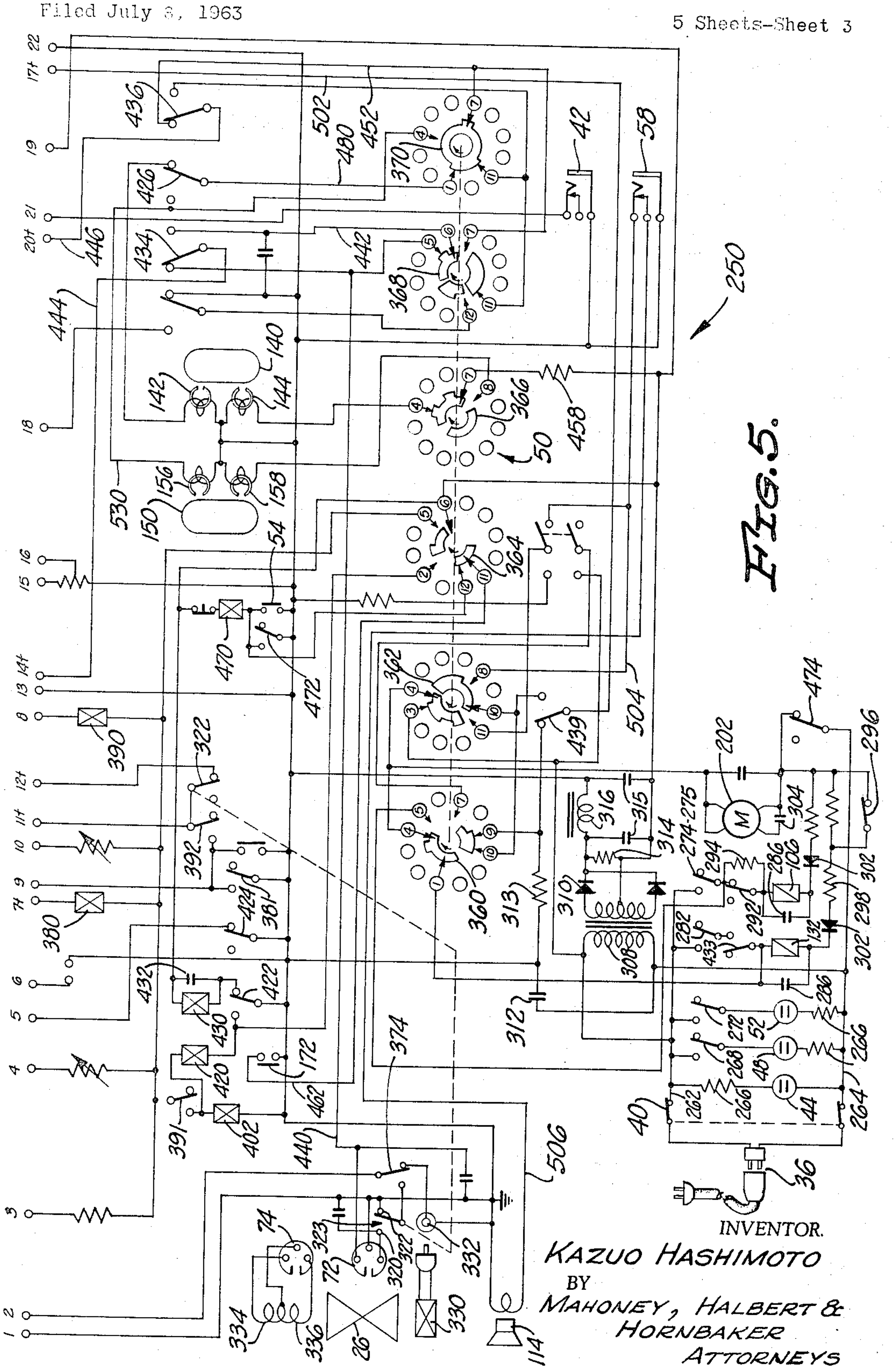
FIG. 5 is a schematic, circuit diagram showing the control portion of the circuit of the telephone answering device.
Figure 6:
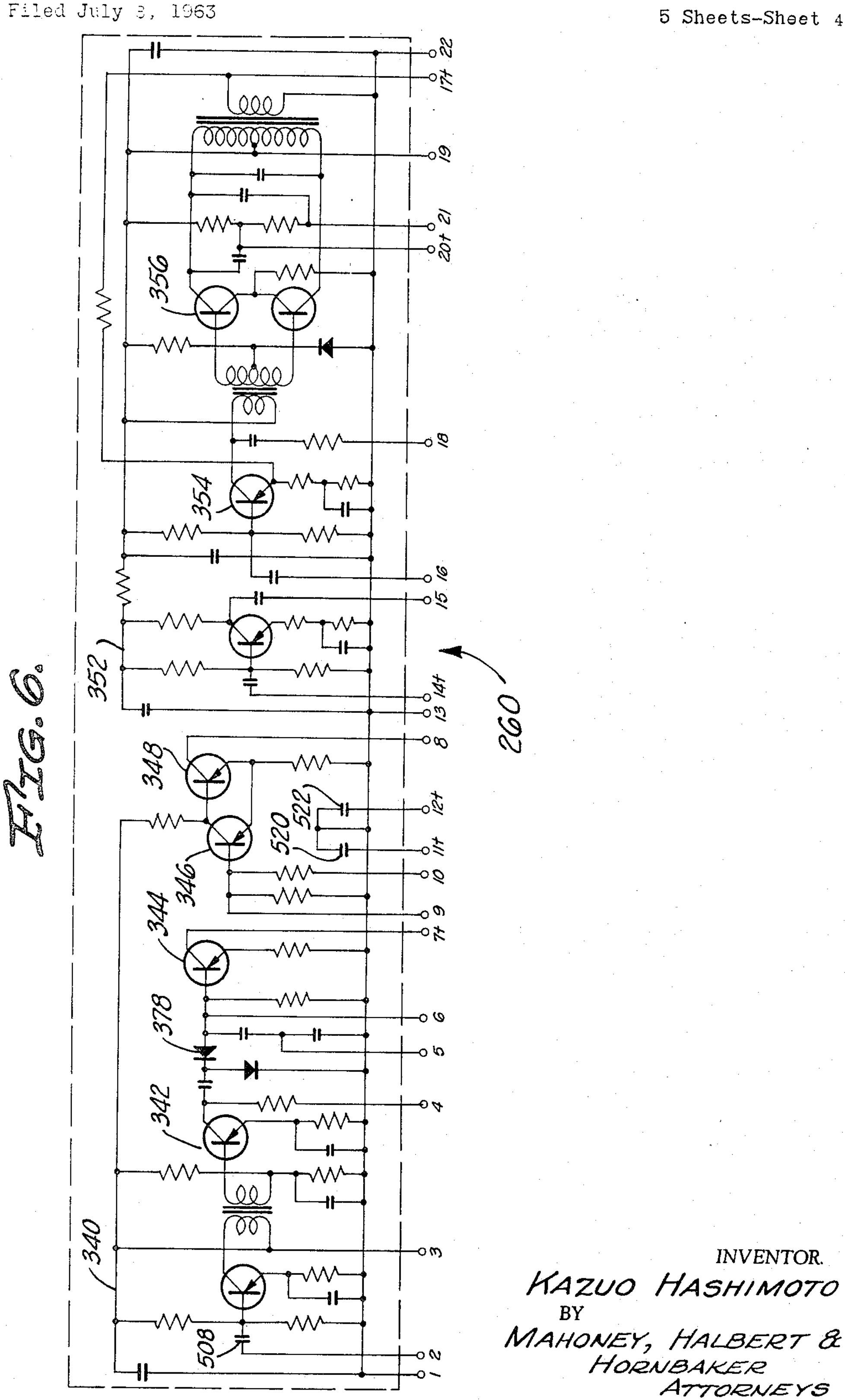
FIG. 6 is a schematic, circuit diagram showing the amplifier portion of the circuit of the answering device.

The control and recording circuit 250 of the telephone answering device 10 is illustrated in FIG. 5 of the drawings while the amplifier circuit 260 is illustrated in FIG. 6, the amplifier circuit 260 serving both to record and reproduce the outgoing and incoming messages on their respective tapes 140 and 150. The amplifier circuit 260 is adapted to be plugged into the control circuit in a conventional manner.

The AC power input 36 to the device 10 is connected in series with the on-off switch 40, FIG. 5, and the light 44, which is constituted by a neon lamp, is connected in parallel across the input leads 262 and 264 to indicate that the device 10 is in operative condition after the switch 40 has been turned on. Also connected in parallel with the input leads 262 and 264 is the light 48 indicating operation of the device in the "absent" condition, that is, in a condition in which the device is adapted to transmit the outgoing message and receive an incoming message automatically in response to the energization of the telephone 26 mounted in operative relationship with the device 10.

Similarly, the signal light 52 is mounted in parallel with the input leads 262 and 264 to indicate that the end of one of the tapes 140 or 150 has been reached. Resistors 266 are in series with the lights 44, 48 and 52 to protect the same.

Also connected in the power circuit between the leads 262 and 264 are relay contacts 268 and 272 connected, respectively, in series with the lights 48 and 52 and adapted to turn them on and off to indicate the condition of the device 10. The solenoid 106, adapted to actuate the lifting arms 90 to lift the handset 30 of the telephone 26 is operable by relay contacts 274 while the yoke solenoid 132 which controls the location of the pinch rollers 298 and 210 is adapted to be energized by relay contacts 282 and 284. Capacitors 286 in parallel with the solenoids 106 and 132 provide an initial increased power input to the solenoid coils when they are energized and also prevent chatter of the armatures 104 and 128 of the solenoids 106 and 132, respectively.

A normally closed microswitch 292 is connected to the solenoid 106 and after the solenoid 106 is energized, the microswitch 292 opens to permit current to flow to the coil of the relay 106 through the resistance 294 to prevent overheating of said coil.

A microswitch 296 functions in the same manner in relationship to the solenoid 132 as the microswitch 292 functions in relationship to the solenoid 106. The microswitch 296 operates through a resistance 298.

Rectifiers 302 rectify alternating current to direct current for the coils of the associated solenoids 106 and 132, and a condenser 304 is associated with the motor 202 to provide for isolation of the motor circuit by absorbing peak pulses of the motor and preventing said peak pulses fom breaking down the rectifiers 302.

A voltage transformer 308 is provided which reduces the line voltage from 110–117 volts to 9 volts. An associated rectifier 310 connected to the secondary of the transformer 308 rectifies the AC current to DC current for power supply. A condenser 312 serves as a noise suppressor for the power circuit, while a dummy resistance 314 functions only when the speaker circuit is being utilized.

A resistance 314, capacitors 315 and choke 316 constitute a filter circuit for the rectified current from the secondary of the transformer 308.

The outgoing message tape 140 and the incoming message tape 150 are illustrated diagrammatically in the circuit 250 in conjunction with their respective reproducing and erasing heads. The contacts 320 and 322 constitute the contacts of the time switch which determines whether the incoming message shall be recorded for a continuous or fixed period of time. The monitor socket 42 and the extension speaker socket 58 are also indicated in the circuit 250.

An annunciator coil 330 is adapted to be plugged into a corresponding receptacle 332 and is housed in the coil housing 82, as previously indicated. In addition, coils 334 and 336 are provided in the induction coil means 78 and are adapted, respectively, to receive and record the incoming message and to determine the continuance of the incoming message when the contact 322 of the time switch has been energized to permit unlimited recording of the incoming message.

Transistor circuits 340, 342, 344, 346, 348, 352, 354 and 356 are incorporated in the amplifier circuit 260 and serve both to amplify the incoming and outgoing messages.

The various numbered terminals of the amplifier circuit 260 are adapted to be placed in contact with the corresponding numbered terminals of the power and recording and reproducing circuit 250, as indicated in FIGS. 5 and 6 of the drawings.

The selector switch 50 includes, as best shown in FIGS. 5 and 7–10 of the drawings, a plurality of contacts which have been numbered in the drawings to facilitate the consideration of the operation of the selector switch. The selector switch includes six sets of rotatable contact bars 360, 362, 364, 366, 368 and 370, which are disposed in a bank and which are adapted to selectively engage different ones of the contacts associated with the selector switch.

As previously indicated, the selector switch 50 is adapted to be disposed in any one of a plurality of positions and is represented, in FIG. 5 of the drawings, as located in the "absent" position in which the device 10 will function to transmit an outgoing message from the outgoing message tape 140 and to automatically record an incoming message upon the incoming message tape 150. When the selector switch 50 is in the "absent" position, the ringing of the telephone bell annunciator will cause the energization of the annunciator coil 330. The signal generated passes through relay contact 374 and to the transistor circuits 340 and 342, the transistor circuit 342 amplifying the output of the transistor circuit 340.

The signal from the transistor circuit 342 is impressed upon the transistor circuit 344 but is rectified by the rectifier 378. The output of the transistor circuit 344 is impressed upon the relay 380. When the relay 380 is operated, the relay contact 381 associated therewith causes the operation of transistor circuits 346 and 348.

A relay 390 controls contacts 391 and 392. When the relay 390 is operated, relay contact 391 operates a relay 402. The relay 402 has four operative contacts including the contacts 274, 275, 282 and 374. When the relay 402 is operated, contacts 274 and 275 are closed and operate the solenoid 106 to cause the lifting arms 90 to raise the handset 30 of the telephone 26. When the contact 282 closes, the solenoid 132 operatively connected to the yoke 222 is also energized to urge the pinch roller 208 into operative relationship with the outgoing message tape 140 and to force said outgoing message tape into engagement with the perimeter of the capstan 206. When the contact 374 of the relay 402 is opened, the circuit to the annunciator coil 330 is opened.

Operation of the relay 402 causes simultaneous operation of a relay 420. The relay 420 has three operative contacts including contacts 422, 424, and 426. The energization of the relay 420 causes the closing of the contact 422 and simultaneous closing of the contacts 424 and 426. When the contact 422 closes, a relay 430 is opened which has previously been energized by the operation of the on-off switch 40.

The relay 430 has a capacitor 432 associated therewith so that there is a one-half second delay in the de-energization of the relay 430 which permits the generation of a beep sound because the input and the output of the amplifier circuit 260 are momentarily connected. Therefore, the necessity for the utilization of separate beep generating circuitry is eliminated. The beep, as pointed out hereinabove, constitutes an audible signal to a calling party to indicate to the calling party that he may initiate the incoming message to be recorded on the incoming message tape 150.

The relay 430 incorporates a contact 433 which is opened by the action of the relay 430 to de-energize the solenoid 132 simultaneously with the generation of the beep signal to cause the yoke 222 to be biased by the spring 230 to bring the pinch roller 210 into operative engagement with the incoming message tape 150 and to correspondingly cause the incoming message tape 150 to engage the perimeter of the capstan 206 thus initiating movement of the incoming message tape 150 across the recording head 156.

As previously indicated, all of the contact bars or segments 360–370 of the selector switch are rotated simultaneously to move them to the various positions of said switch discussed hereinabove. When the selector switch 350 is located in the message position, the device 10 is then adapted to function in recording the outgoing message on the outgoing message tape 140. To utilize the device 10 in this manner, the handset 30 of the telephone 26 is lifted off the base and the dial tone eliminated by dialing one number. The outgoing message is then dictated upon the outgoing message tape through the telephone handset 30, the signal generated by dictating in the handset 30 being picked up by the coil 334 which is mounted in the induction coil means 78 associated with the earpiece 34 of the handset 30.

The location of the various contact bars or segments 360–370 of the selector switch 350 in the message position of said selector switch is illustrated in FIG. 5 of the drawings. The signal from the coil 334 is carried by the lead 440 from the socket 72 to contact 5 associated with the segments 368 and through one of said segments to the contact 6 and lead 442 to a contact 434 of the relay 430 whence the signal is impressed through lead 444 and terminal 14*t*, FIG. 5, upon the input of transistor circuit 352.

The signal is amplified by transistor circuits 352, 354 and 356 and is transmitted through a lead 446 connected to terminals 20*t* to a contact 436 of the relay 430. From the contact 436 of the relay 430, the signal passes through a lead 452 and through the segment 370 through contacts 11 and 1 and relay contact 426 to the recording head 142 associated with the outgoing message tape 140.

The erasing head 144 is operated at the same time to clear the outgoing message tape 140 and is operated through the contacts 4 and 7 associated with the segments 366 and the resistance 458 from the output of the capacitor 350.

After the outgoing message tape 140 has completed its circuit past the recording head 142, the length 184 of conductive foil on said outgoing message tape engages the pole 172 which is connected by a lead 462 through contacts 11 and 12 associated with switch segments 364 to a relay 470. A contact 472 of the relay 470 closes and the relay 470 is maintained in operative condition. At the same time, the contact 474 of the relay 470 is opened so that the motor 202 is stopped. At the same time, the contact 272 of the relay 470 is closed to light the tape end light 52 to indicate that the end of the outgoing message tape 140 has been reached.

Figure 7:
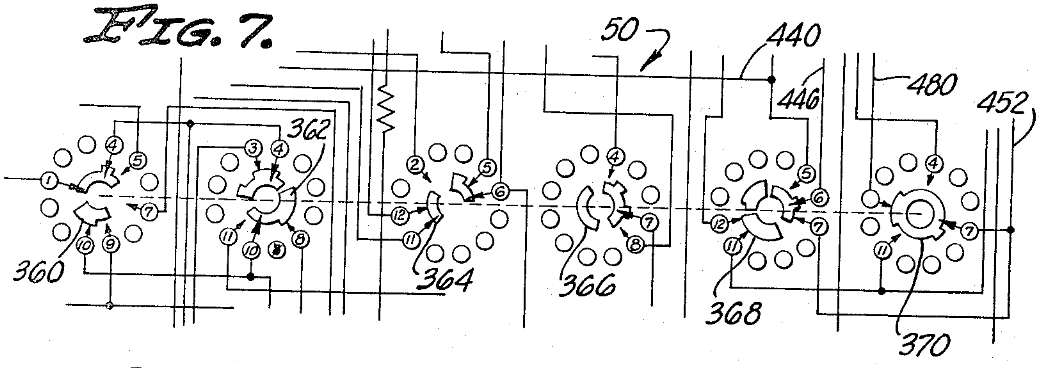
FIG. 7 is a schematic view illustrating the position of the various contacts of the selector switch in the confirm position.

In order to determine whether the outgoing message which has been recorded on the outgoing message tape 140 is satisfactory, the selector switch is turned to the confirm position, which is represented in FIG. 7 of the drawings. In the confirm position, the tape end lamp 52 is still on and the relay 470 is still operative to maintain the relay contact 474 in open position and thus render the motor 202 inoperative. When the test button 54 is pressed to close the circuit to the motor 202, the relay 470 is deenergized which permits the relay contact 474 to close and the motor 202 to resume operation. The contact 272 of the relay 470 is also opened which permits the lamp 52 to go out. The recording head 142 then operates as a playback head in conjunction with the outgoing message tape 140. When the lamp 52 is out, it is not necessary to depress the test button 54 since the mere rotation of the selector switch 50 to the confirm position will cause the operation of the device 10 to permit the message on the outgoing message tape 140 to be checked. This is due to the fact that the relay 470 is inoperative and the contact 474 to the motor 202 closed.

The signal from the outgoing message tape 140 passes through relay contact 426, through a lead 480, to contact 1 of the segments 370 of the selector switch 50. It then passes to the contact 7 associated with segment 370 to contact 7 associated with segment 368 whence it passes to contact 6 of segment 368 and through the lead 446 to relay contact 434 to terminal 14*t* and the input of transistor circuit 352. The signal is amplified through transistor circuits 352–356 and passes to output through terminal 17*t* and a lead 502 to a relay contact 439 and the segments 362 by means of the contacts 8 and 10 associated therewith through a lead 504, the external speaker plug 58 and a lead 506 to the speaker 114.

If the recording of the outgoing message on the outgoing message tape 140 is not adequate, the selector switch 50 can be turned to the message position and the recording process repeated. If the outgoing message is successfully recorded, the selector switch 50 can be turned to the "absent" position which places the device 10 in condition for automatic operation.

Figure 8:
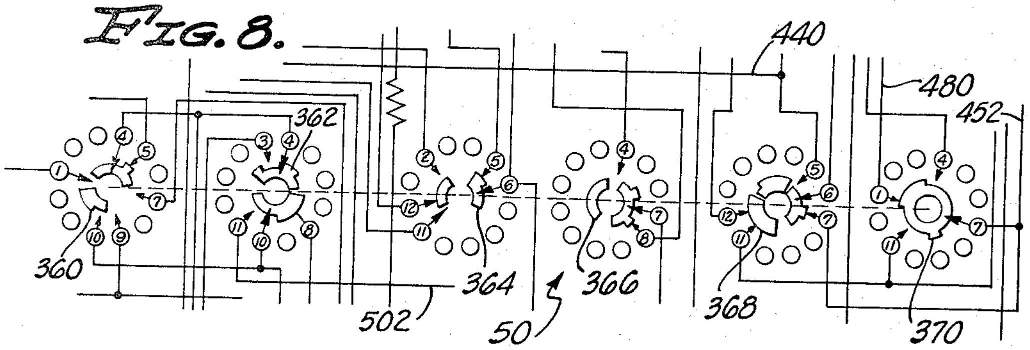
FIG. 8 is a view showing the location of the various contacts of the selector switch when the switch is located in the absent position.

When the switch 50 is located in the "absent" position, the various segments of said switch assume the positions as shown in FIG. 8 of the drawings, and the energization of the annunciator of the telephone 26 causes the energization of the coil 330, which generates a signal passing through the relay contact 374 and capacitor 508, FIG. 6, into the base of the transistor of the transistor circuit 340.

The signal received from the telephone when an incoming message is transmitted thereby is amplified in the transistor circuits 340–344, and the output of the transistor circuit 344 is connected to the relay 380 through the terminal 7*t* which causes the energization of said relay. The energization of the relay 380 is accompanied by the closing of the relay contact 381 which causes the operation of the transistor circuits 348 and 352. The transistor circuit 352 operates the relay 390 to close the contact 391 and energize the relay 402. The contacts 274–275 and 282 of the relay 402 close to cause the simultaneous energization of the solenoids 106 and 132 to, respectively, permit the lifting arms 90 to raise the handset 30 of the telephone 26 and to move the yoke 222 into a position in which the pinch roller 208 will engage the outgoing message tape 140 with the capstan 206. This causes the outgoing message on the outgoing message tape 140 to be transmitted through the speaker 114 to the mouthpiece 32 of the handset 30.

The outgoing message on the tape 140 is picked up by the reproducing head 142 and passes through the relay contact 426 and the lead 480 to contact 1 associated with the segment 370 of the switch 50, as best shown in FIG. 8 of the drawings. The signal then passes to contact 7 associated with the segment 370 through the lead 452 to contacts 7 and 6 associated with the segments 368 and through relay contact 434 and the lead 444 to the transistor circuits at 352–356. From terminals 17*t* of the transistor circuits 352–356 and lead 502, the signal passes to contact 10 of segments 362 and through contact 8 associated with the segments 362 through a lead 504, the external speaker plug 58 and the lead 506 to the speaker 114. The speaker 114 delivers the outgoing message to the mouthpiece 32 of the handset 30 so that the calling party can hear the same.

The playing of the outgoing message tape 140 is automatically terminated in the above described manner and the calling party can then hear the beep tone generated by the amplifier so that if he wants to leave a message, he can begin to speak. The calling party's voice is picked up through the coil 334 from the earpiece 34 of the handset 30, the signal passing through the lead 440 and the relay contact 434 to the amplifiers 352–356. From the transistor circuits 352–356, the signal passes through a relay contact 436 and thence through the lead 452 to contact 7 of segment 370 through contact 1 of segment 370 through lead 480 to the relay contact 426 and thence to recording head 156 associated with the incoming message tape to record the message.

When the coil 330 was energized, it caused the operation of transistor circuits 340–344 to operate the relays 380 and 390. The transistor circuits 346 and 348 serve as timer circuits. When the relay contact 381 is opened and closed, the transistor circuits 346 and 348 hold the relay 390 in operative condition for approximately 15 seconds. This is attributable to the timer circuit constituted by the capacitors and resistances operatively connected in the transistor circuits 346 and 348.

Capacitors 520 and 522 are provided whose discharge determines the period of time during which the relay 390 will be maintained operative. The discharge of the capacitor takes approximately thirty seconds and then the relay 390 is automatically de-energized to stop the motor 202 and de-energize the solenoid 106 to permit the handset 30 of the telephone 26 to be returned to the base 28 of the telephone.

As previously indicated, the contacts 320 and 322 of the timer switch 323, FIG. 5, determine whether the device 10 will record the incoming message upon the incoming message tape 150 for a continuous unlimited period or for a predetermined length of time. When the switch 323 is in the continuous position, the contact 320 is closed and the contact 322 is open. When the contact 322 is open, the capacitor 522 is dropped out of the circuit thus leaving only the capacitor 520 and the time period is very short. When the timer switch 323 is in the continuous position to permit continuous recordation of a calling party's message, the coil 336 is connected directly through the relay contact 374 to the transistor circuits 340–344.

The voice of the calling party maintains the relay 380 in energized condition by its peaks and thus drives the relay 380 so that the contact 381 thereof intermittently opens and closes so that the light 48 will flicker through the relay contact 268 to indicate continuous operation and so that the timer circuit constituted by the transistor circuits 346 and 348 will be continuously operative. In addition, the solenoid 106 will be energized to hold the handset 30 off the base 28 of the telephone 26.

Therefore, so long as the calling party talks, the device 10 will remain operative. If the voice of the calling party should stop for oven ten seconds, the timer circuit constituted by the transistor circuits 346 and 348 is automatically de-energized by the discharge of the capacitor 520, the motor 202 being stopped and the solenoid 106 being de-energized to permit the handset 30 to be returned to the base 28 of the telephone 26.

Figure 9:
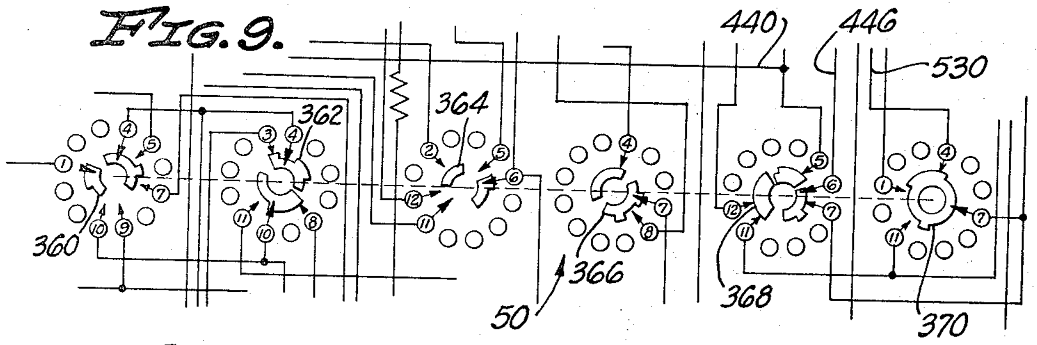
FIG. 9 is a schematic diagram showing the position of the various contacts of the selector switch when the switch is located in the listening position.

When the person utilizing the device 10 returns and wishes to review the incoming messages left by calling parties on the incoming message tape 150, he turns the switch 50 to the listening position and the segments 360–370 of said switch assume the attitude illustrated in FIG. 9 of the drawings. To start the incoming message tape 150, an electrical connection is made through the contacts 3 and 4 of segments 362 so that the motor 202 can operate. The solenoid 132 is inoperative because the relay contact 282 is open and, therefore, tthe pinch roller 210 urges the incoming message tape 150 against the capstan 206.

The incoming message is transmitted by the head 156 on the lead 500 at 30 and passes through contacts 4 and 7 associated with the segment 370, as best shown in FIG. 9 of the drawings, and through contacts 7 and 6 associated with the segments 368 through the lead 446 to the relay contact 434 and the lead 444 to the transistor circuits 352–356. The amplified signal is fed to the speaker 114 through the leads 502, 504, and 506.

In this manner, the recorded incoming messages on the incoming message tape 150 can be reviewed. When the end of the incoming tape 150 has been reached, the length 194 of conductive foil thereupon contacts the pole 190 and de-energizes the relay 470 to stop the motor 202 and light the lamp 52 indicating that the end of the incoming message tape 150 has been reached. The incoming messages can be played as many times as desired by pushing the test button 54 to re-energize the circuit and energize the relay 470.

Figure 10:
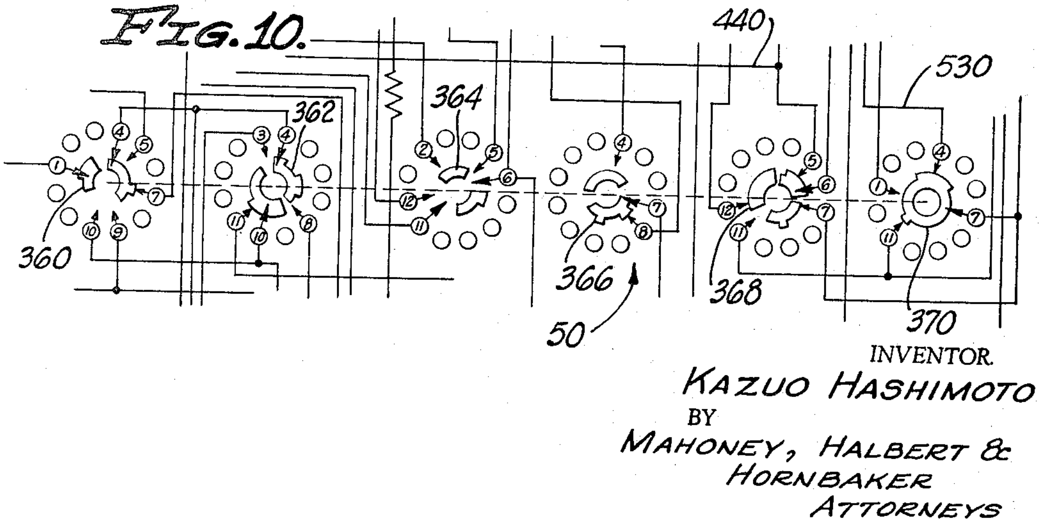
FIG. 10 is a schematic diagram illustrating the location of the selector switch contacts when the switch is located in the recording position.

In order to utilize the record position wherein the telephone answering device 10 can be used as a tape recorder, contacts 5 and 6 associated with the segments 368 of the switch 50, as best shown in FIG. 10, are connected so that the signal is transmitted through the lead 440 and the lead 446 and through the relay contact 438 and lead 444 into the transistor amplifiers 352–356. From the amplifier circuit 260, the signal passes through terminals 20*t* into the lead 446 and the relay contact 426 and thence through contacts 11 and 4 associated with the segment 370, as best shown in FIG. 10 of the drawings, and into the lead 530 to the recording head 156 associated with the incoming message tape 150.

I thus provide by my invention an automatic telephone answering device which is characterized by the fact that it may be placed in any one of a plurality of conditions by the utilization of a single selector switch which eliminates the possibility of erasing messages and other contingencies which can arise when the control is a push-button control. Moreover, the device of the invention is characterized by the fact that the incoming and outgoing message tapes are energized by a single source and by the fact that the time allotted to the outgoing message is determined by circuit breaking means incorporated in the outgoing message tape itself and adapted to control an associated circuit.

Another advantage of the device of the invention is the fact that it incorporates a timer circuit which permits the incoming message to be received, either for a predetermined length of time or continuously, as desired. Moreover, the amplifier circuit of the device serves both the outgoing message and incoming message tapes and serves to permit the recordation of messages upon said tapes.

I claim:

1. In a telephone answering and recording device, the combination of an induction coil to pick up the telephone bell and telephone voice signal, an amplifier to amplify said telephone bell and voice signal through said induction coil, the first relay which is energized by the output of said amplifier, a C–R timer circuit which is energized by operating one contact of said first relay, the second relay which is energized by said timer circuit, an actuating means which is energized by said second relay to connect or disconnect the hook switch of the telephone set physically, first selective switch connecting or disconnecting said telephone voice signal to said amplifier input after the operation of said actuating means, the second selective switch increasing or decreasing the time constant of said timer circuit, an out-going message driving means which is operated by said actuating means for terminating the operation at the end of said out-going message tape and incoming message tape driving means which is operated after the end of said out-going message and terminating the operation after finishing of time constant of said timer circuit.

2. A telephone answering and recording device according to claim 1 wherein said second relay initiates the operation by connecting the contact of said first relay and after disconnection of said contact remaining in operation so long as the predetermined time constant does not finish.

3. A telephone answering and recording device according to claim 1 wherein said second relay continues energization by the operation of said first relay which is energized due to the telephone voice signal through said first selective switch so long as the pause of the voice signal does not overtime the time constant which is predetermined by said second selective switch and terminates said energization at the end of the incoming message tape.

4. In a telephone answering and recording device, the combination of the first driving means to drive the pre-recorded out-going message tape, the second driving means to drive the incoming message tape after the end of the out-going message tape, the third relay coacting with said first driving means, the fourth relay coacting with said second driving means, an audio amplifier of said out-going and incoming message signal, a speaker circuit to transmit the out-put said audio amplifier, a feed back circuit connecting in-put and out-put of said amplifier through a contact of said third relay and a contact of said fourth relay in series connection, a delay circuit means to delay the release of one of the third or the fourth relays at the end of said out-going message tape and to energize said feed back circuit for the delaying time in which the contact of the third relay connects in series with the other contact of the fourth relay.

5. A telephone answering and recording device according to claim 4 wherein said feed back circuit generates howling in said audio amplifier which is transmitted through said speaker to the calling party who recognizes it as beep-tone signal.

6. In a telephone answering and recording device, the combination of the first driving means to drive an out-going message tape by engaging the first pinch roller to a common capstan, the second driving means to drive an incoming message tape by engaging the second pinch roller to a common capstan, the third relay coacting with said first driving means, the fourth relay coacting with said second driving means, a conductive foil on the out-going message tape and an associated pole piece which makes the breaking circuit and stops the outgoing message tape at its termination, and delay means which delay releasing of one of the third or fourth relays and disengages said first pinch roller from said common capstan after contacting said conductive foil and pole piece at the end of said outgoing message tape.

References Cited

UNITED STATES PATENTS

| | | | |
|---|---|---|---|
| 2,549,548 | 4/1951 | Zimmerman | 179—6 |
| 2,896,945 | 7/1959 | Waldman | 179—6 |
| 2,928,898 | 3/1960 | Salzberg et al. | 179—6 |
| 3,127,474 | 3/1964 | Waldman | 179—6 |
| 3,155,778 | 11/1964 | Meyer | 179—100.2 |

TERRELL W. FEARS, *Primary Examiner.*

BERNARD KONICK, *Examiner.*

P. SPERBER, *Assistant Examiner.*